United States Patent [19]

Workman

[11] Patent Number: 4,616,276

[45] Date of Patent: Oct. 7, 1986

[54] DISK FILE SERVO CONTROL SYSTEM WITH FAST REDUCTION OF REPEATABLE HEAD POSITION ERROR

[75] Inventor: Michael L. Workman, San Jose, Calif.

[73] Assignee: International Business Machines Corporation, Armonk, N.Y.

[21] Appl. No.: 755,527

[22] Filed: Jul. 16, 1985

[51] Int. Cl.$^4$ ............................................. G11B 5/56
[52] U.S. Cl. ........................................................ 360/77
[58] Field of Search ..................................... 360/77, 78

[56] References Cited

U.S. PATENT DOCUMENTS

| 3,881,184 | 4/1975 | Koepcke et al. | 360/78 |
| 4,135,217 | 1/1979 | Jacques et al. | 360/77 |
| 4,412,161 | 10/1983 | Cornaby | 318/561 |

OTHER PUBLICATIONS

"Design of a Disk File Head-Positioning Servo", IBM J. Res. Develop., Nov. 1974, pp. 506-512, R. K. Oswald.
"Track-Locating and -Following Apparatus for a Flexible Disk File", IBM Technical Disclosure Bulletin, vol. 23, No. 2, Jul. 1980, pp. 738-742, R. C. Jahnke.
"Self-Calibrating Disk Storage Apparatus", IBM Technical Disclosure Bulletin, vol. 19, No. 6, Nov. 1976, pp. 1991-1992, Griffiths et al.
"Disk Runout Accommodation", IBM Technical Disclosure Bulletin, vol. 21, No. 7, Dec. 1978, pp. 2688-2691, J. P. Mantey.
"Adaptive Filters", Aspects of Network and System Theory, by Bernard Widrow, pp. 563-587, Holt, Rinehart and Winston, Inc. N.Y., 1970.

Primary Examiner—George G. Stellar
Attorney, Agent, or Firm—Thomas R. Berthold

[57] ABSTRACT

An improvement to a disk file servo control system removes repeatable error from the read/write head position error signal (PES) during track following. The disk file includes a microprocessor 60 and associated memory devices 62, 64. A table of values of a sine function having a frequency equal to the disk rotational frequency is stored in a memory device. The microprocessor 60 receives each sample of PES from the servo control system and values from the sine function table in the memory device and computes a group of tap weights, each tap weight being a function of the PES sample, the value of a sine or cosine function with a frequency at one of the harmonics of the disk rotational frequency, a learning rate factor and the corresponding value of the tap weight for the previous PES sample. For each PES sample, the tap weights in a group are added to generate a repeatable error correction signal $U_c$ which is summed with the control signal U to the head actuator, thereby generating a modified control signal $U_m$ which causes the head to follow the true track centerline. The repeatable error components are thus removed from the PES.

15 Claims, 5 Drawing Figures

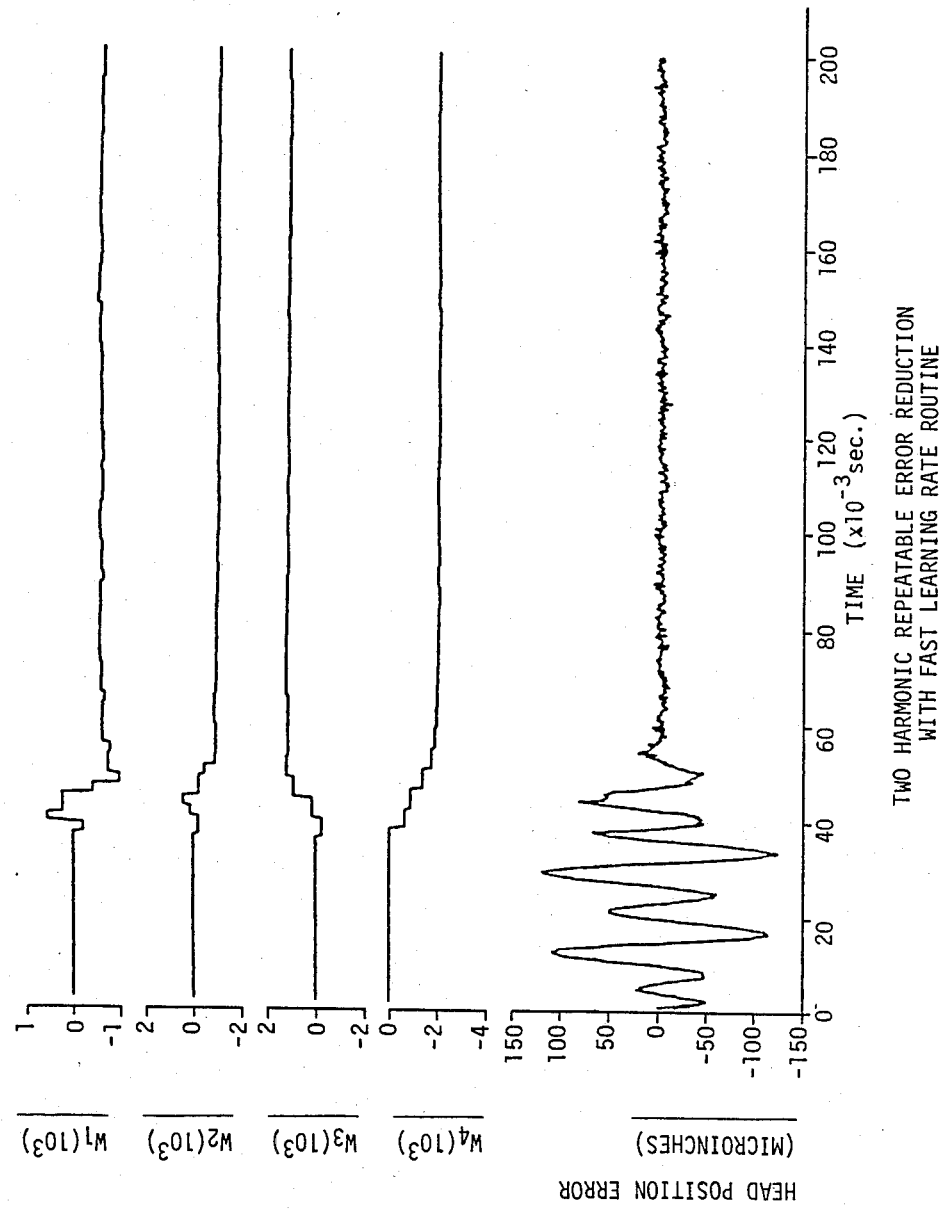

4,616,276

DISK FILE SERVO CONTROL SYSTEM WITH FAST REDUCTION OF REPEATABLE HEAD POSITION ERROR

TECHNICAL FIELD

This invention relates to servo control systems for read/write head positioning in disk files, and more particularly to a track following servo control system with fast reduction of those components of the position error signal caused by repeatable factors as disk runout or eccentricity and spindle motor wobble.

BACKGROUND OF THE INVENTION

Disk files (or "drives") are information storage devices which utilize a rotatable disk with concentric data tracks containing the information, a head (or "transducer") for reading or writing data onto the various tracks, and an actuator connected to the head for moving it to the desired track and maintaining it over the track centerline during read or write operations The movement of the head to a desired track is referred to as track accessing or "seeking", while the maintaining of the head over the centerline of the desired track during read or write operations is referred to as track "following".

In disk files which have a relatively high density of data tracks on the disk, it is necessary to incorporate a servo control system to maintain the head precisely over the desired track during read or write operations. This is accomplished by utilizing prerecorded servo information either on a dedicated servo disk or on sectors angularly spaced and interspersed among the data on a data disk. During track following, the servo information sensed by the read/write head (or the dedicated servo head if a dedicated servo disk is used) is demodulated to generate a sampled position error signal (PES) which is an indication of the position error of the head away from the track centerline. The PES is used in the servo feedback loop to generate a control signal to the actuator to move the head back to the track centerline. A description of operation of a general disk file servo control system is given by R. K. Oswald in "Design of a Disk File Head-Positioning Servo", *IBM Journal of Research and Development*, November 1974, pp. 506–512.

There are several causes for the head being off the track centerline during track following and which thus contribute to the PES. Certain position error components are of a low frequency, that is of a frequency close to the frequency of rotation of the disk, and are repeatable with disk rotation. For example, if the disk is not precisely centered over the axis of rotation of the spindle motor, the circular tracks will have an eccentric shape relative to the axis of rotation. This will cause a repeatable disk "runout" error at the same frequency as the rotation of the disk. Similarly, even if the disk is precisely mounted about the spindle motor axis, but the spindle motor axis "wobbles" during rotation, this will also generate repeatable errors, typically at the fundamental and second harmonic frequencies of the disk rotational frequency. The problem of repeatable error is magnified in disk files which have multiple disks since each disk, and indeed each disk surface, will have its own unique repeatable error signature.

Several techniques have been used to remove this repeatable error from the PES so that the PES contains only nonrepeatable generally high frequency components. Such techniques typically use either the measured or predicted repeatable error to generate a signal which modifies the control signal to the actuator so that the head follows the true shape of the track centerline.

In one technique, as disclosed in co-pending patent application, Ser. No. 606,009, assigned to the same assignee as this application, the control signal to the actuator, which is a direct function of the acceleration of the head, is integrated twice to generate a pseudo head position signal. This signal is summed with the PES and the resultant signal is twice differentiated to generate a signal which is stored for at least one disk rotation. The stored signal is then later read out and combined with the actuator control signal.

U.S. Pat. 4,135,217 to Jacques et al. discloses a servo control system in a disk file of the type which utilizes an external transducer for generating signals representing a coarse position of the head. These coarse position signals are representative of the repeatable error and are stored in a memory device. During track following the repeatable error information is recalled from memory and used to generate an error signal to control the head and cause it to follow the true centerline of the desired track.

An article entitled "Track Locating and Following Apparatus For A Flexible Disk File" by R. C. Jahnke, *IBM Technical Disclosure Bulletin*, Vol. 23, No. 2 (July 1980) pp. 738–742 and an article entitled "Self Calibrating Disk Storage Apparatus" by D. E. Griffiths and H. E. VanWinkle, *IBM Technical Disclosure Bulletin*, Vol. 19, No. 6 (November 1976) pp. 1991–1992, both disclose methods of improving the track following characteristics of the head by sensing and storing information relating to the true profile of the tracks and later using that stored profile information as part of the control signal to the actuator.

An article entitled "Disk Runout Accommodation" by J. P. Mantey, *IBM Technical Disclosure Bulletin*, Vol. 21, No. 7 (December 1978) pp. 2688–2691, discloses a method for predicting the repeatable error by using the error signal and its rate of change to generate a disk runout estimator signal for input to the actuator control signal.

The prior techniques for removing repeatable error from the PES typically require at least four to five disk revolutions, in order to assure system stability, before the measured or estimated repeatable error signal can be applied to the control signal. More importantly, it may be necessary to store many track profiles for each disk or to utilize complex algorithms to estimate the profile of a track at a particular radius based upon the measured profile of a track at another radius. In the case of disk files with multiple disks this requires a substantial amount of memory storage space.

SUMMARY OF THE INVENTION

The present invention provides an improved servo control system for track following which generates, for each sample of PES, a group of "tap weights" to be used to generate a modified actuator control signal. Each tap weight is a function of the tap weight for the previous PES sample, the measured PES for the current sample, and an appropriate sine or cosine function having a frequency corresponding to one of the harmonics of the disk rotational frequency. Each tap weight is multiplied by its appropriate sine or cosine function and the resultant products are then summed to provide a correction signal corresponding to the repeatable error for that PES sample. This correction signal is then combined with the PES for that sample to provide a modified control signal to the actuator.

The disk file incorporating the improved servo control system utilizes a microprocessor and suitable memory storage devices, one of the memory storage devices containing values of a sine function having a frequency equal to the rotational frequency of the disk. In operation, the microprocessor utilizes an algorithm derived from the Widrow-Hoff least mean squares ("LMS") algorithm used in the design of adaptive digital filters. Each sample of the PES, which is representative of the head position error at a particular angular position on the track corresponding to a specific sample of servo information, is used in the algorithm to estimate the repeatable error at the next angular position on the track where the next sample of servo information is to be read. The predicted repeatable error improves with each PES sample because of a fast "learning rate" routine incorporated into the LMS algorithm. Thus, the repeatable error is rapidly and substantially removed from the PES, usually within one revolution of the disk. In addition, unlike prior art disk files very little memory storage space is used with the present invention. This is because for each servo surface it is necessary to store only two tap weights per harmonic frequency and only "N" values of a sine function, where N is the number of PES samples per disk revolution.

BRIEF DESCRIPTION OF THE DRAWINGS

FIG. 5 is an illustration of the variation of track position error and tap weights as a function of time for a disk file with the servo control system using fundamental and second harmonic frequencies and with the implementation of the fast learning rate routine.

DESCRIPTION OF THE PREFERRED EMBODIMENTS

Figure 1:
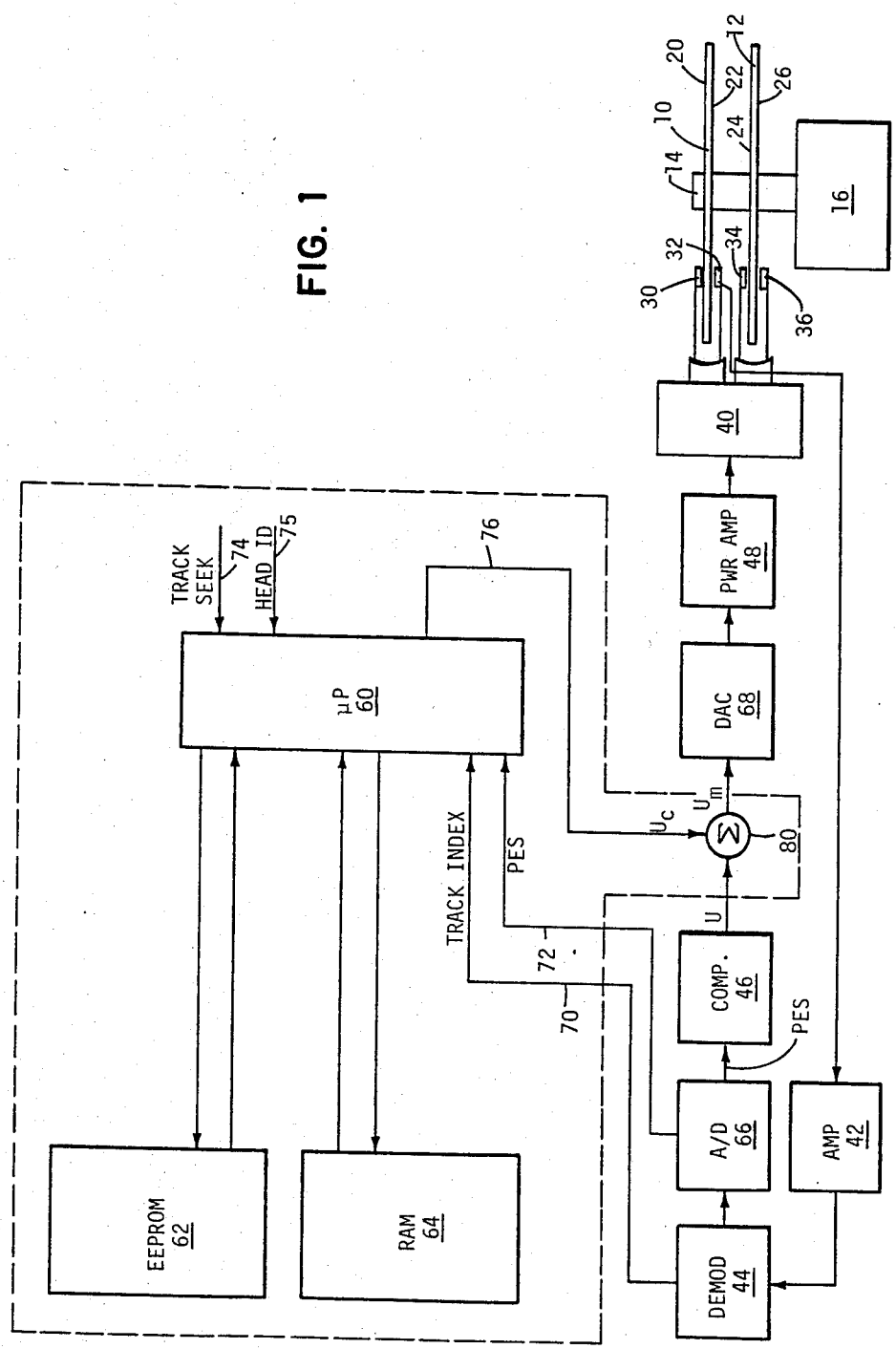
FIG. 1 is a block diagram of the servo control system showing the implementation of the present invention for reduction of repeatable error during track following.

The block diagram of FIG. 1 includes a conventional disk file servo control system. The present invention which is an improvement to a conventional servo control system is shown generally surrounded by the dotted line in FIG. 1. A pair of disks 10, 12 are supported on a spindle 14 of the disk file drive motor 16. Each of the disks 10, 12 has two surfaces 20, 22 and 24, 26, respectively. For purposes of this description, surface 20 on disk 10 and surfaces 24, 26 on disk 12 are data recording surfaces. Surface 22 on disk 10 is a dedicated servo surface and contains only prerecorded servo information. The servo information is recorded in concentric tracks and is typically written in such a manner that the intersections of adjacent servo tracks on servo surface 22 are radially aligned with the centerlines of the data tracks on surfaces 20, 24, and 26.

The specific tracks on the data disks and the servo disk are accessed by heads 30, 32, 34, 36, each of which is associated with a respective disk surface and supported by an associated arm/suspension assembly. The heads 30, 32, 34, 36 are attached to a common accessing means or actuator 40. Thus the heads 30, 32, 34, 36 are all maintained in a fixed relationship with one another relative to the radial position on their respective disk surfaces. The actuator 40 in magnetic recording disk files is typically a "voice coil motor" (VCM) which comprises a coil movable through the magnetic field of a permanent magnetic stator.

The output of the dedicated servo head 32 is supplied to an amplifier 42 and then to demodulator 44. Demodulator 44 processes the servo information signal from disk surface 22 and demodulates it to generate a PES. The PES from demodulator 44 is an indication of the position of the servo head 32 away from the centerline of the data track on which the heads 30, 34, 36 are desired to be located. If the servo system is designed to be of the digital type, the PES is then converted into a digital PES signal by analog to digital (A/D) converter 66 and then output to compensator 46. (If the servo control system is a conventional analog system, then the PES from demodulator 44 would be input directly into compensator 46, unlike as shown in FIG. 1.) The compensator 46 contains circuitry having specific gain and phase shifting characteristics to assure that the PES is properly sensed and within a certain bandwidth for stability of the overall transfer function. The compensated PES signal output from compensator 46, in the case of a conventional servo control system, would be output directly to a power amplifier 48 which would amplify the compensated PES to provide a control signal to actuator 40. The control signal to actuator 40, which in the example of FIG. 1 is a VCM, is a specific current level to move the VCM so that the data heads 30, 34, 36 and the servo head 32 are moved toward the centerline of the desired data track.

The improved servo control system for track following includes the above-described components of a conventional system and in addition a microprocessor 60 which is connected by suitable address and data bus lines to an electrically erasable programmable read only memory (EEPROM) 62 and a random access memory (RAM) 64. In order to incorporate the improvement of the present invention (which is generally those components surrounded by the dotted line in FIG. 1) into a conventional analog servo control system, A/D converter 66 is located between demodulator 44 and compensator 46 and a digital-to-analog converter (DAC) 68 is located between compensator 46 and power amplifier 48.

The microprocessor 60 receives a track index signal along line 70, a digital PES signal along line 72 from A/D converter 66, and a digital track seek signal along line 74. The track index signal is generated from specifically coded information on each servo track and is an indication of the beginning of the track. Since the modification of the control signal to reduce repeatable error in the PES, as accomplished by microprocessor 60, only occurs during track following, the receipt of a track seek signal along line 74 interrupts the operation of microprocessor 60.

The microprocessor 60 also receives a head identification (ID) signal along line 74 which informs the microprocessor 60 which of the servo heads is reading the servo information. In the example of FIG. 1 there is only one servo head, head 32. However, the disk file could contain a large number of disks and several dedicated servo disks, each servo disk being accessed by a dedicated servo head. Alternatively, each data surface in a disk file with multiple disks could contain servo information in sectors interspersed with data around the disk, in which case each read/write head would also function as a servo read head. In such types of disk files the head ID signal along line 75 is used by microprocessor 60 to recognize which of the servo surfaces is being accessed.

The microprocessor 60 utilizes the track index signal, digital PES signal, information stored in EEPROM 62 and a specific algorithm to generate a correction signal ($U_c$) along output line 76 to reduce repeatable error in the PES. The algorithm is derived from a more general algorithm described in an article entitled "Adaptive Filters" by Bernard Widrow in *Aspects of Network and System Theory*, R. E. Kalman and N. De Claris, Eds., Holt, Reinhardt and Winston (1970) pp. 563–587 and will be explained in the following manner.

If the servo information on disk 22 is sampled N times for each disk revolution there will be N samples of PES which can be designated PES(0) through PES(N−1). Other than the track index signal which indicates the beginning of a track, the digital PES is the only servo information input required by microprocessor 60 to compute the correction signal $U_c$ for a particular disk surface. For each PES sample, PES(0) through PES(N−1), there will be a corresponding correction signal sample, designated $U_c(0)$ through $U_c(N-1)$. The general form of the correction signal for any sample "k" is given by the following expression:

$$U_c(k) = W_1(k)X_1(k) + W_2(k)X_2(k) + W_3(k)X_3(k) + W_4(k)X_4(k) \tag{1}$$

The terms $W_1(k)$ through $W_4(k)$ form a group of tap weights computed by the microprocessor 60 for each sample "k", and the terms $X_1(k)$ through $X_4(k)$ are values at sample "k" of sine and cosine functions with frequencies equal to the fundamental and second harmonic of the disk rotational frequency.

The terms $X_1(k)$ through $X_4(k)$ in equation (1) are defined as follows:

$$X_1(k) = \sin[k(2\pi/N)] \tag{2}$$

$$X_2(k) = \cos[k(2\pi/N)] \tag{3}$$

$$X_3(k) = \sin[2k(2\pi/N)] \tag{4}$$

$$X_4(k) = \cos[2k(2\pi/N)] \tag{5}$$

The term $(2\pi/N)$ in equations (2) through (5) is equal to the rotational frequency of the disk in radians per sample of PES. The term $X_1$ is merely the sine function at the fundamental frequency and the term $X_2$ is the cosine function at the fundamental frequency. Similarly, $X_3$ is the sine function at twice the disk rotational frequency (i.e., the second harmonic) and $X_4$ is the cosine function at the second harmonic. If it is desired to remove higher harmonic components of the repeatable error from the PES, then additional values of X are utilized in the algorithm, each value of X being a corresponding sine or cosine function at the integral multiple of the rotational frequency corresponding to the desired harmonic. For purposes of this explanation, however, it is assumed that it is desired to reduce repeatable error caused only by the fundamental frequency and the second harmonic. Thus only $X_1$ through $X_4$ are required. However, the algorithm utilized in the present invention to reduce the repeatable error in the PES is fully applicable with any number of harmonics. Two tap weights are required for each harmonic.

Figure 2:
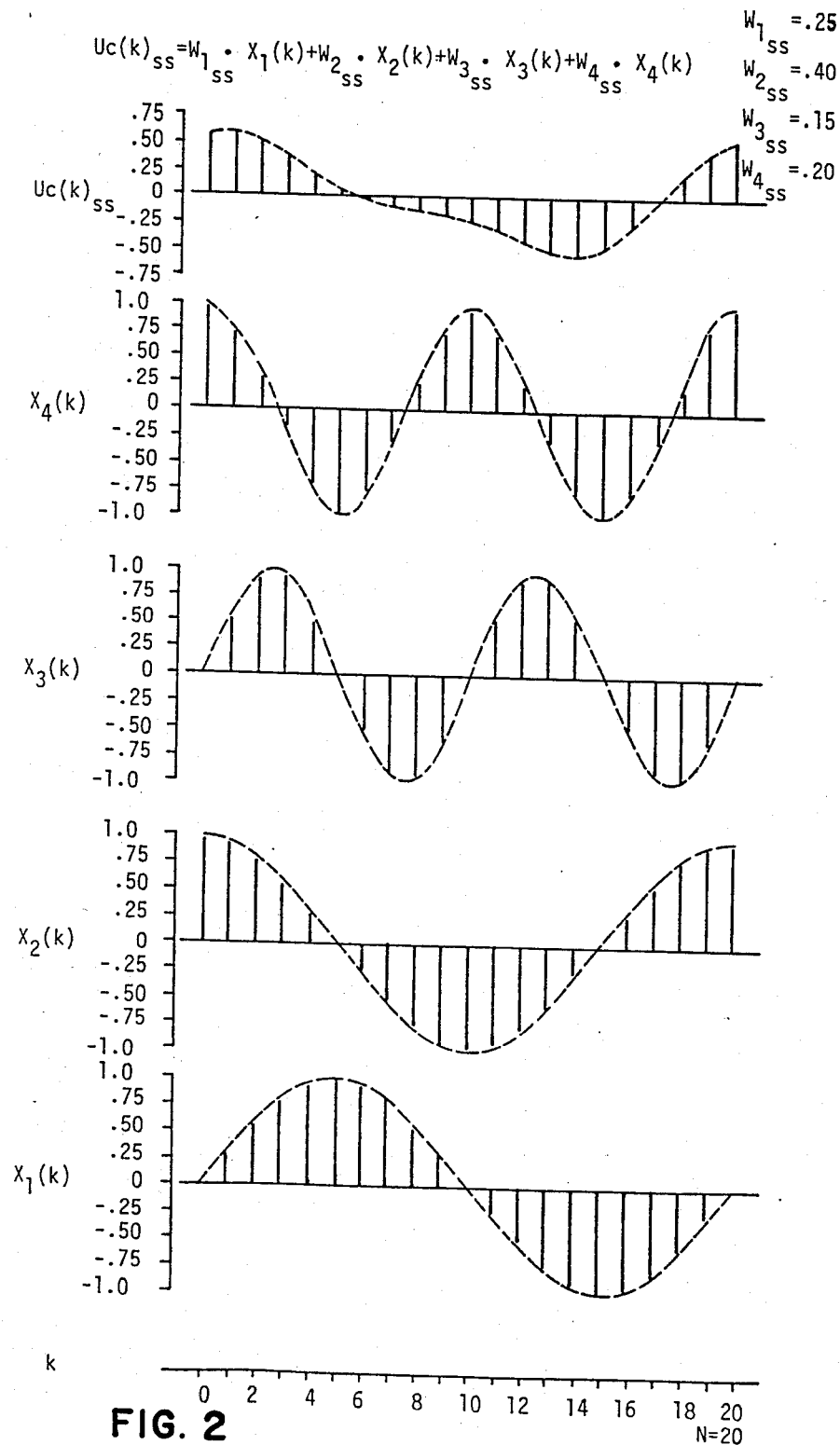
FIG. 2 is a flow chart of the algorithm for computing the repeatable error correction signal.

By referring to the graphical illustration of FIG. 2 it will be understood that $X_1(k)$ through $X_4(k)$ can be computed from a table of N values of the sine function at the fundamental frequency. This table of sine values for N=20 is shown illustrated in FIG. 2 as $X_1(k)$ and is stored in EEPROM 62 (FIG. 1). FIG. 2 is a graphical representation of equations (2) through (5) on an axis which can be thought of as corresponding to a data track centerline. It should be apparent that equations (3) through (5) can be derived, through standard trigonometric identities, as functions of equation (2). Thus, each value of $X_2(k)$ through $X_4(k)$ is already present in EEPROM 62 as one of the values of $X_1(k)$. The following equations are expressions for $X_2(k)$ through $X_4(k)$ as functions of the N values of the sine function stored in EEPROM 62.

$$X_1(k) = \text{EEPROM}[\text{address } (k) \text{ modulo } (N-1)] \tag{6}$$

$$\tag{7}$$

$$X_2(k) = \text{EEPROM}\left[\text{address}\left(k + \frac{N}{4}\right) \text{ modulo } (N-1)\right]$$

$$X_3(k) = \text{EEPROM}[\text{address } (2k) \text{ modulo } (N-1)] \tag{8}$$

$$\tag{9}$$

$$X_4(k) = \text{EEPROM}\left[\text{address}\left(2k + \frac{N}{4}\right) \text{ modulo } (N-1)\right]$$

The equations for the computation of each group of tap weights is as follows:

$$W_1(k+1) = W_1(k) + C(k)*PES(k)*X_1(k) \tag{10}$$

$$W_2(k+1) = W_2(k) + C(k)*PES(k)*X_2(k) \tag{11}$$

$$W_3(k+1) = W_3(k) + C(k)*PES(k)*X_3(k) \tag{12}$$

$$W_4(k+1) = W_4(k) + C(k)*PES(k)*X_4(k) \tag{13}$$

In this example where only the fundamental and second harmonic frequencies are used in the algorithm to reduce repeatable error, a group of tap weights is defined as the tap weights $W_1$ and $W_2$ (for the fundamental frequency) and $W_3$ and $W_4$ (for the second harmonic) for each sample k. Thus there will be a group of tap weights $W_1$ through $W_4$ computed for each sample of PES. In equations (10) through (13) the term PES(k) and the terms $X_1(k)$ through $X_4(k)$ have been previously described. The term C(k) is a predetermined factor which is referred to as the "learning rate" term and affects the rate of convergence of the tap weights to their steady state values. The expression for C(k) is as follows:

$$C(k) = C_o Q^k + C_{ss} \tag{14}$$

In this fast learning rate equation, the terms $C_o$ and $C_{ss}$ are constants. The value "Q" is selected to be between 0 and 1. The value $C_o$, the initial value of C(k), and Css, the steady state value of C(k), are determined experimentally in order to get the desired adaptation rate, i.e. the rate at which the tap weights reach their steady state value. The LMS algorithm will compute the tap weights and will function to reduce repeatable error if C(k) in equations (10) through (13) is selected to be simply a constant, e.g. $C_{ss}$. The incorporation of the variable learning rate factor C(k) according to the fast learning rate equation (14) is to rapidly reduce the repeatable error. By referring to equation (14) it will be noted that since Q is between 0 and 1, the first term on the right side of equation (14) approaches 0 as k increases, so that C(k) approaches $C_{ss}$ with increasing k.

Figure 3:
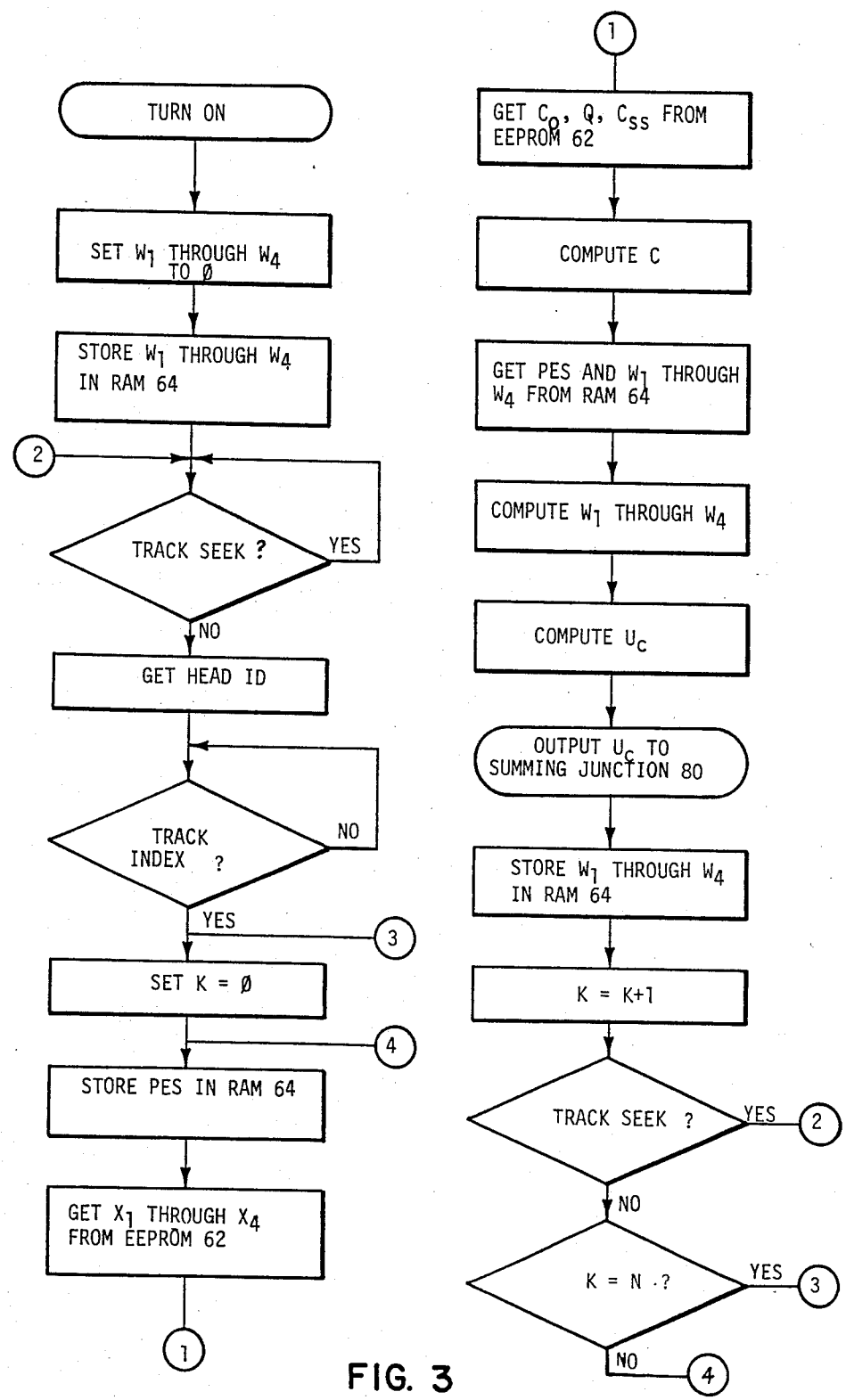
FIG. 3 is a graphical representation of the fundamental frequency sine function stored in memory, the cosine fundamental and sine and cosine second harmonic frequencies computed from the stored sine function, and the correction signal computed with arbitrary steady state tap weights.

The incorporation of the fast learning rate equation in the specific algorithm to reduce the repeatable error during track following in a disk file can be better understood by reference to the flow chart of FIG. 3 and the block diagram of FIG. 1. When the disk file is first turned on the microprocessor 60 sets the first group of tap weights $W_1(0)$ through $W_4(0)$ to 0 and stores these values in RAM 64. As long as there is no track seek signal along line 74, then microprocessor 60 will function to generate the correction signal $U_c$ to summing junction 80. The microprocessor 60 receives the head ID signal along line 75 to indicate which of the servo surfaces is being accessed so that the corresponding set of tap weights can be computed. When the track index signal 70, which is an indication of the beginning of the track, is received by microprocessor 60, then the process for the generation of the correction signal $U_c$ begins. The value k is set to 0 and the first PES sample, PES(0), is received by microprocessor 60 and stored in RAM 64. The microprocessor 60 then recalls from EEPROM 62 the values $X_1(0)$ through $X_4(0)$, which as described previously and as shown graphically in FIG. 2, are all taken from the same stored set of values of the sine function of the fundamental frequency of rotation of the disk. The values $X_1(0)$ through $X_4(0)$ will be taken from the EEPROM 62 addresses computed in equations (6) through (9). The microprocessor 60 then recalls from EEPROM 62 the predetermined constants $C_o$, Q and $C_{ss}$ and then computes C(0) as a function of these three values and the value k, according to equation 14. For the first computation of the correction signal, namely $U_c(0)$ corresponding to the first PES sample PES(0), it can be determined from an observation of equation (14) that C(0) will equal $C_o+C_{ss}$, since k equals 0. The microprocessor 60 next recalls the current value of PES from RAM 64 and the current values of $W_1$ through $W_4$, which for the first computation when k equals 0 have been initially set to 0. The microprocessor computes $W_1(0)$ through $W_4(0)$ according to equations 10 through 13. The result is the first group of tap weights based upon the first PES sample. This first group of tap weights is then used to compute the first correction signal $U_c(0)$ according to equation (1). The value $U_c(0)$ is output by microprocessor 60 along line 76 to summing function 80 (FIG. 1) where it is summed with the control signal U(0) from compensator 46 to create a modified control signal $U_m(0)$ for input to DAC 68.

The values of $W_1$ through $W_4$ just computed by microprocessor 60 are then stored in RAM 64 and replace the previous initial values. The value k is then indexed by 1. The microprocessor 60 is now prepared to receive the next PES sample and recompute the new values of $W_1$ through $W_4$ according to equations (10) through (13) and the new value of $U_c$. This process continues for each sample of PES as long as the disk file continues to operate. However, it should be appreciated that the tap weights rapidly approach a steady state value and the learning rate factor C(k) rapidly approaches $C_{ss}$. Thus, after a relatively short period of time (i.e. after k reaches a certain value) there is little or no change in the values of the tap weights and the correction signal $U_c(k)$ varies with each PES sample only as the values of $X_1(k)$ through $X_4(k)$ vary with each PES sample. As indicated in the flow chart on FIG. 2 this process will continue, but will be interrupted if a track seek signal is received by microprocessor 60 along line 74. The result is that a plot of $U_c(k)$ for $k=0$ to $N-1$, that is for one revolution of the disk or for one entire track, will replicate the components of the PES caused by repeatable error. The correction signal $U_c$ for each PES sample is thus the summation of a value of sine and cosine functions at the fundamental frequency, each multiplied by an appropriate steady state tap weight, plus a sine and cosine function at the second harmonic, each multiplied by a corresponding steady state tap weight. This plot of the steady state correction signal, $U_c(k)_{ss}$, is shown in FIG. 2 for an arbitrary set of steady state tap weights $W_1$ through $W_4$.

Since the computation of $U_c$ continues during operation of the disk file, any changes in the repeatable error will be automatically sensed and new tap weights computed to generate a new correction signal $U_c$. Changes in the repeatable error may occur for a number of reasons, including temperature changes or mispositioning of the disk on the spindle. While in the example described above, the values $W_1$ through $W_4$ are initially set to 0 each time the disk file is turned on, it is within the scope of the present invention to store these values in nonvolatile memory, such as EEPROM 62, so that each time the disk file is turned on the previous tap weights are recalled and used as the initial tap weights. Similarly, in those types of multiple disk files described previously, a set of tap weights corresponding to each servo surface can be stored in EEPROM 62 so that when the head identification signal along 75 is received, the proper set of prior tap weights can be recalled to compute the correction signal for that particular servo surface.

Figure 4:
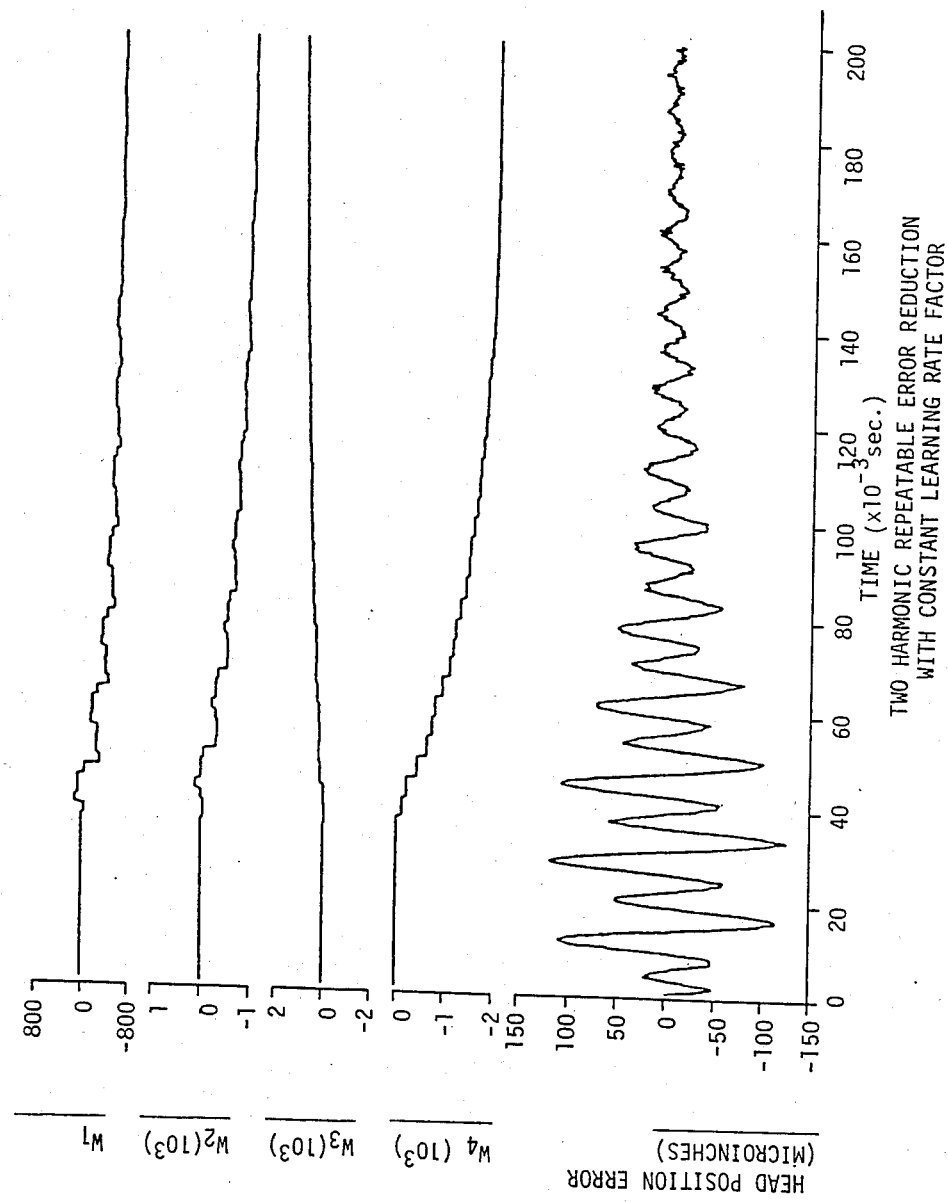
FIG. 4 is an illustration of the variation of track position error and tap weights as a function of time for a disk file with the servo control system using only fundamental and second harmonic frequencies.

Referring now to FIG. 4, the variation of the tap weights and the reduction of the repeatable error are shown as functions of time for the case in which the learning rate factor C(k) is set equal to a constant, $C_{ss}$. In this case the system is turned on at 35 microseconds and the repeatable error reduction occurs at approximately 160 microseconds, at which time the tap weights have also reached their steady state values. The position error after 160 microseconds is essentially caused by nonrepeatable factors such as system noise.

When the fast learning rate routine of equation (14) is used, the result is shown in FIG. 5. The system is turned on at 35 microseconds and the tap weights have reached their steady state values at approximately 55 microseconds. Thus the use of the variable fast learning rate factor C(k) according to equation (14) results in a much more rapid reduction in the repeatable error, as can be seen by a comparison of FIGS. 4 and 5.

In some servo systems, the compensator 46 (FIG. 1) has a significant phase shift at the fundamental and second harmonic frequencies. If the present invention is utilized with such servo systems, then the output of compensator 46, namely the control signal U, would be input to microprocessor 60 in place of the PES signal along line 72 from A/D converter 66. The operation of the disk file would otherwise be identical to that previously described, with the exception that the value U(k) would replace the value PES(k) in equations (10) through (13).

While the preferred embodiments of the present invention have been illustrated in detail, it should be apparent that modifications and adaptations of those embodiments will occur to those skilled in the art without departing from the sphere and scope of the present invention as set forth in the following claims.

What is claimed is:

1. In a method for controlling the data track following of a head in a disk file of the type having a disk with servo information thereon defining data track centerlines, a head for reading samples of servo information at corresponding angular positions around the disk, means for generating from the sampled servo information a sampled head position error signal (PES) corresponding to misposition of the head from the data track centerline, means for generating a control signal from the PES, an actuator connected to the head for positioning the head over the track centerline in response to the control signal, logic means coupled to the PES generating means and the actuator, and a memory storage means connected to the logic means, an improvement to the method comprising the steps of:

successively storing in the memory storage means for each sample of PES, a value representative of each sample of PES;

generating, for each sample of PES, a group of values of sine and cosine functions having frequencies corresponding to the harmonics of the disk rotational frequency;

computing, for each sample of PES, a group of tap weights, each tap weight in a group being associated with one of the generated values of sine and cosine functions, the computation of each tap weight in the group further comprising multiplying the associated value of sine or cosine function by the value representative of the PES sample and a predetermined factor and adding the resulting product to the corresponding tap weight in the group of tap weights computed for the previous sample of PES, the initial group of tap weights having been previously stored in the memory storage means;

summing, for each sample of PES, the products of each of the tap weights in the group and their respective values of sine or cosine functions so as to generate a repeatable error correction signal; and summing the repeatable error correction signal with the control signal to the actuator to generate a modified control signal to the actuator, whereby the head positioning error from the track centerline due to repeatable error is substantially removed from the PES.

2. The improved method according to claim 1 wherein the step of generating a group of values of sine and cosine functions further comprises computing, from the sine function having a frequency corresponding to the frequency of rotation of the disk, a cosine function having a frequency corresponding to the frequency of rotation of the disk, a sine function having a frequency corresponding to twice the frequency of rotation of the disk and a cosine function having a frequency corresponding to twice the frequency of rotation of the disk.

3. The improved method according to claim 1 wherein the predetermined factor is a constant.

4. The improved process according to claim 1 wherein the step of multiplying by a predetermined factor further comprises multiplying by a learning rate factor which is generally variable with each PES sample, the learning rate factor being computed from an expression whereby the learning rate factor approaches a constant steady state value as the number of PES samples increases.

5. The improved method according to claim 4 wherein the learning rate expression is $C(k) = C_o Q^k + C_{ss}$, where k is a counter for each successive PES sample, C(k) is the predetermined factor for each PES sample, $C_o$ and $C_{ss}$ are constants, and Q is a constant having a value between 0 and 1.

6. The improved method according to claim 1 wherein the disk file is of the type also having means for compensating the generated PES, wherein the step of storing includes the step of storing a value representative of each sample of compensated PES and wherein the step of multiplying includes the step of multiplying by the value representative of the compensated PES.

7. The improved method according to claim 1 including the step of storing the group of tap weights in the memory storage means after all of the tap weights in the group have reached a steady state value, whereby the stored steady state tap weights form the initial group of tap weights.

8. The improved method according to claim 2 wherein the disk file has multiple disks with servo information thereon and means for receiving a signal identifying the servo surface being accessed, and wherein the step of computing a group of tap weights includes the step of computing a group of tap weights for a particular servo surface in response to the identifying signal.

9. In a disk file of the type having a disk with servo information thereon defining data track centerlines, a head for reading samples of servo information, means for generating from the sampled servo information a sampled head position error signal (PES) corresponding to misposition of the head from a data track centerline, means for generating a control signal from the PES, and an actuator connected to the head for positioning the head over the track centerline in response to the control signal, an improvement for removing repeatable error from the PES during data track following, the improvement comprising:

memory storage means for storing a learning rate factor and values of a sine function having a frequency corresponding to the disk rotational frequency;

means for generating, for each PES sample, a repeatable error correction signal, the error correction signal generating means further comprising
means for computing from the PES sample, the sine function values and the learning rate factor, a group of tap weights, each tap weight in the group being the sum of the previous tap weight and the product of the PES sample, a preselected one of the sine function values and the learning rate factor, and
means for summing the tap weights in the group to generate a repeatable error correction signal; and means for summing the repeatable error correction signal to the control signal so as to provide a modified control signal to the actuator, whereby the head positioning error from the track centerline due to repeatable error is substantially removed from the PES.

10. The improved disk file according to claim 9 wherein the learning rate factor stored in the memory storage means includes three predetermined constants and wherein the error correction means includes means for computing, for each sample of PES, a variable learning rate factor from the three constants stored in the memory storage means

11. The improved disk file according to claim 10 wherein the variable learning rate factor computing means computes the variable learning rate factor $C(k)$ from the equation $$C(k) = C_o Q^k + K_{ss},$$

$C_o$ and $C_{ss}$ being predetermined constants, Q being a predetermined constant having a value between 0 and 1 and k being a counter which is incremented with each PES sample.

12. The improved disk file according to claim 9 wherein the disk file is of the type having means for compensating the PES and wherein the tap weight computing means includes means for computing the tap weights from the compensated PES.

13. The improved disk file according to claim 9 wherein the computing means includes means for receiving a track seek signal for interrupting the generating of the repeatable error correction signal.

14. The improved disk file according to claim 9 wherein the memory storage means includes means for storing the tap weights when the tap weights have reached a steady state value.

15. The improved disk file according to claim 9 wherein the disk file is of the type having multiple disk surfaces with servo information thereon and means for generating a signal identifying the servo surface being accessed, and wherein the tap weight computing means includes means for computing the tap weights for a particular servo surface in response to the servo surface identifying signal.

* * * * *

UNITED STATES PATENT AND TRADEMARK OFFICE
CERTIFICATE OF CORRECTION

PATENT NO. : 4,616,276

DATED : October 7, 1986

INVENTOR(S) : Michael L. Workman

It is certified that error appears in the above-identified patent and that said Letters Patent is hereby corrected as shown below:

IN THE CLAIMS:

Column 11, line 12, claim 11, the formula "$C(k) = C_0 Q^k + K_{ss}$" should be --$C(k) = C_0 Q^k + C_{ss}$--.

Signed and Sealed this

Twenty-seventh Day of January, 1987

*Attest:*

DONALD J. QUIGG

*Attesting Officer*  *Commissioner of Patents and Trademarks*